(12) United States Patent
Li et al.

(10) Patent No.: US 12,170,634 B2
(45) Date of Patent: Dec. 17, 2024

(54) DYNAMIC AND SEMI-PERSISTENT SCHEDULING MIXED MULTI-PANEL UPLINK PRECODING

(71) Applicant: QUALCOMM Incorporated, San Diego, CA (US)

(72) Inventors: Qiaoyu Li, Beijing (CN); Yu Zhang, Beijing (CN); Liangming Wu, Beijing (CN); Hao Xu, Beijing (CN); Min Huang, Beijing (CN); Chenxi Hao, Beijing (CN); Chao Wei, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 17/435,635

(22) PCT Filed: Mar. 11, 2019

(86) PCT No.: PCT/CN2019/077679
§ 371 (c)(1),
(2) Date: Sep. 1, 2021

(87) PCT Pub. No.: WO2020/181459
PCT Pub. Date: Sep. 17, 2020

(65) Prior Publication Data
US 2022/0150035 A1  May 12, 2022

(51) Int. Cl.
*H04L 5/00* (2006.01)
(52) U.S. Cl.
CPC .......... *H04L 5/0094* (2013.01); *H04L 5/0026* (2013.01); *H04L 5/0048* (2013.01)

(58) Field of Classification Search
CPC .... H04L 5/0094; H04L 5/0026; H04L 5/0048
See application file for complete search history.

(56) References Cited

U.S. PATENT DOCUMENTS

2014/0307646 A1* 10/2014 Chen ............... H04W 72/02
370/329
2018/0279313 A1   9/2018 Papasakellariou
(Continued)

FOREIGN PATENT DOCUMENTS

| CA | 3056577 A1 * | 9/2018 | ........... H04L 1/1614 |
| CA | 3036351 C * | 8/2022 | ........... H04L 1/0061 |

(Continued)

OTHER PUBLICATIONS

Qualcomm Incorporated: "Enhancement to Configured Grants in NR Unlicensed", 3GPP Draft, 3GPP TSG RAN WG1 Meeting #96, R1-1902988 7.2.2.2.4 Enhancements to Configured Grants for NR-U, 3rd Generation Partnership Project (3GPP), Mobile Competence Centre, 650, Route Des Lucioles, F-06921 Sophia-Antipolis CE, vol. RAN WG1, No. Athens, Greece, Feb. 25, 2019-Mar. 1, 2019, Feb. 16, 2019 (Feb. 16, 2019), XP051600685, 9 Pages, CBG Based Transmission in NR-U Configured Grant, p. 6, paragraph 3.5.
(Continued)

*Primary Examiner* — Saad A. Waqas
(74) *Attorney, Agent, or Firm* — Muncy, Geissler, Olds & Lowe, P.C./Qualcomm

(57) ABSTRACT

In conventional wireless communication systems, only a single transmit precoding matrix indicator (TPMI) with a single associated sounding reference signal (SRS) resource indicator (SRI) is configured/activated in downlink control signal (DCI) for retransmission of data. To enable better performance in retransmission, the UE may dynamically turn on/off/switch panels for retransmissions.

33 Claims, 5 Drawing Sheets

(56) References Cited

U.S. PATENT DOCUMENTS

2019/0363843 A1* 11/2019 Gordaychik .............. H04L 1/08
2020/0106559 A1*  4/2020 Vilaipornsawai ..... H04L 1/1896

FOREIGN PATENT DOCUMENTS

| CN | 108111283 A | 6/2018 | |
|---|---|---|---|
| CN | 108631831 A | 10/2018 | |
| CN | 109152035 A | 1/2019 | |
| EP | 3641452 A1 | 4/2020 | |
| WO | 2018231141 A1 | 12/2018 | |
| WO | WO-2018228120 A1 * | 12/2018 | ........... H04B 7/0421 |

OTHER PUBLICATIONS

Supplementary European Search Report—EP19918662—Search Authority—The Hague—Sep. 28, 2022.
International Search Report and Written Opinion—PCT/CN2019/077679—ISA/EPO—Nov. 29, 2019.
3GPP TS 38.214: "5G, NR, Physical Layer Procedures for Data, 3rd Generation Partnership Project, TSG RAN, NR, Physical Layer Procedures for Data (Release 15)", ETSI, Technical Specification, Mobile Competence Centre, 650, Route Des Lucioles, F-06921 Sophia-Antipolis Cedex, France, vol. RAN WG1, No. V15.2.0 (Jun. 2018), Jun. 29, 2018, XP051474491, 95 Pages, Section 5.2.2.3.1, p. 26-p. 87, sections 5.1.3, 5.1.6.3.

* cited by examiner

DYNAMIC AND SEMI-PERSISTENT SCHEDULING MIXED MULTI-PANEL UPLINK PRECODING

The present application claims priority to International Application No. PCT/CN2019/077679, filed Mar. 11, 2019, which is assigned to the assignee hereof, and is incorporated herein by reference in its entirety.

TECHNICAL FIELD

Various aspects described herein generally relate to wireless communication systems, and more particularly, to dynamic and semi-persistent scheduling (SPS) mixed multi-panel uplink (UL) precoding.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps).

Typical multi-panel user equipments (UEs) do not have the capability of coherent combining between certain panels. Therefore, during sounding reference signal (SRS) transmission, only a certain part of the panels may be used for a certain SRS resource, and a configured/indicated transmit precoding matrix indicator (TPMI) with associated SRS resource indicator (SRI) may only be used by this certain part of the panels.

In Release 15 of the Third Generation Partnership Project (3GPP) standard, only a single TPMI with a single associated SRI is configured/activated for configured grant physical uplink shared channel (PUSCH) transmission. During a PUSCH transmission with configured grant, the other part of the panels, which is not associated with the configured/indicated TPMI, will not be used, even if this part would have potential benefits in terms of diversity.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary method performed by a user equipment (UE) is disclosed. The method comprises receiving a radio resource control (RRC) configuration from a network. The RRC configuration comprises configurations of one or more initial resource combinations supported by a configured grant uplink (UL) resource for initial transmission of data to the network. The RRC configuration also comprises one or more interpretation rules to be applied by the UE for retransmission of the data to the network. The method also comprises receiving a schedule of the configured grant UL resource from the network, transmitting the data on the configured grant UL resource to the network using the one or more initial resource combinations, and receiving a downlink control information (DCI) from the network for retransmission of the data. The DCI includes a schedule of a retransmission UL resource. The method further comprises determining one or more retransmission resource combinations based on the one or more interpretation rules and the DCI, and retransmitting the data on the retransmission UL resource using the one or more retransmission resource combinations. Each initial resource combination and each retransmission resource combination includes a combination of resource parameters. The resource parameters includes any one or more of a sounding reference signal (SRS) resource indicator (SRI), a transmit precoding matrix indicator (TPMI), and antenna ports.

An exemplary method performed by a network node is disclosed. The method comprises sending a radio resource control (RRC) configuration to a user equipment (UE). The RRC configuration comprises configurations of one or more initial resource combinations supported by a configured grant uplink (UL) resource for initial transmission of data from the UE to the network node. The RRC configuration also comprises one or more interpretation rules to be applied by the UE for retransmission of the data to the network node. The method also comprises sending a schedule of the configured grant UL resource to the UE, and sending, upon an error in receiving the data on the configured grant UL resource from the UE using the one or more initial resource combinations, a downlink control information (DCI) to the UE for retransmission of the data, the DCI including a schedule of a retransmission UL resource. The method further comprises receiving the data on the retransmission UL resource from the UE using the one or more retransmission resource combinations. Each initial resource combination and each retransmission resource combination includes a combination of resource parameters. The resource parameters includes any one or more of a sounding reference signal (SRS) resource indicator (SRI), a transmit precoding matrix indicator (TPMI), and antenna ports. The DCI indicates a combination of SRI, TPMI, and antenna ports.

Further, the one or more interpretation rules specify to the UE that the one or more retransmission resource combinations are to be determined based on comparisons of the SRI, TPMI, and antenna ports indicated in the DCI with the SRI, TPMI, and antenna ports of the one or more initial resource combinations configured through the RRC configuration.

Another exemplary method performed by a user equipment (UE) is disclosed. The method comprises receiving a radio resource control (RRC) configuration from a network. The RRC configuration comprises configurations of one or more initial resource combinations supported by a configured grant uplink (UL) resource for initial transmission of data to the network. The method also comprises receiving a schedule of the configured grant UL resource from the network, transmitting the data on the configured grant UL resource to the network using the one or more initial resource combinations, and receiving a downlink control information (DCI) from the network for retransmission of the data. The DCI includes a schedule of a retransmission UL resource. The method further comprises determining one or more retransmission resource combinations based on the DCI, and retransmitting the data on the retransmission UL resource using the one or more retransmission resource combinations. The DCI indicates a plurality of resource combinations. Each initial resource combination and each retransmission resource combination includes a combination of resource parameters. The resource parameters include any one or more of a redundancy version (RV), a sounding reference signal (SRS) resource indicator (SRI), transmit precoding matrix indicator (TPMI), and antenna ports.

Another exemplary method performed by a network node is disclosed. The method comprises sending a radio resource control (RRC) configuration to a user equipment (UE). The RRC configuration comprises configurations of one or more initial resource combinations supported by a configured grant uplink (UL) resource for initial transmission of data to the network. The method also comprises sending a schedule of the configured grant UL resource to the UE, and sending, upon an error in receiving the data on the configured grant UL resource from the UE using the one or more initial resource combinations, a downlink control information (DCI) to the UE for retransmission of the data. The DCI includes a schedule of a retransmission UL resource and indicates a plurality of resource combinations. The method further comprises receiving the data on the retransmission UL resource from the UE using the one or more retransmission resource combinations. Each initial resource combination and each retransmission resource combination includes a combination of resource parameters. The resource parameters include any one or more of a redundancy version (RV), a sounding reference signal (SRS) resource indicator (SRI), transmit precoding matrix indicator (TPMI), and antenna ports.

An exemplary user equipment (UE) is disclosed. The UE comprises a transceiver circuitry, a memory circuitry, and a processor circuitry. The transceiver, memory circuitry and processor circuitries are configured to receive a radio resource control (RRC) configuration from a network. The RRC configuration comprises configurations of one or more initial resource combinations supported by a configured grant uplink (UL) resource for initial transmission of data to the network. The RRC configuration also comprises one or more interpretation rules to be applied by the UE for retransmission of the data to the network. The transceiver, memory circuitry and processor circuitries are also configured to receive a schedule of the configured grant UL resource from the network, transmit the data on the configured grant UL resource to the network using the one or more initial resource combinations, and receive a downlink control information (DCI) from the network for retransmission of the data. The DCI includes a schedule of a retransmission UL resource. The transceiver, memory circuitry and processor circuitries are further configured to determine one or more retransmission resource combinations based on the one or more interpretation rules and the DCI, and retransmit the data on the retransmission UL resource using the one or more retransmission resource combinations. Each initial resource combination and each retransmission resource combination includes a combination of resource parameters. The resource parameters includes any one or more of a sounding reference signal (SRS) resource indicator (SRI), a transmit precoding matrix indicator (TPMI), and antenna ports.

An exemplary network node is disclosed. The network node comprises a transceiver circuitry, a memory circuitry, and a processor circuitry. The transceiver, memory circuitry and processor circuitries are configured to send a radio resource control (RRC) configuration to a user equipment (UE). The RRC configuration comprises configurations of one or more initial resource combinations supported by a configured grant uplink (UL) resource for initial transmission of data from the UE to the network node. The RRC configuration also comprises one or more interpretation rules to be applied by the UE for retransmission of the data to the network node. The transceiver, memory circuitry and processor circuitries are also configured to send a schedule of the configured grant UL resource to the UE, and send, upon an error in receiving the data on the configured grant UL resource from the UE using the one or more initial resource combinations, a downlink control information (DCI) to the UE for retransmission of the data, the DCI including a schedule of a retransmission UL resource. The transceiver, memory circuitry and processor circuitries are further configured to receive the data on the retransmission UL resource from the UE using the one or more retransmission resource combinations. Each initial resource combination and each retransmission resource combination includes a combination of resource parameters. The resource parameters includes any one or more of a sounding reference signal (SRS) resource indicator (SRI), a transmit precoding matrix indicator (TPMI), and antenna ports. The DCI indicates a combination of SRI, TPMI, and antenna ports. Further, the one or more interpretation rules specify to the UE that the one or more retransmission resource combinations are to be determined based on comparisons of the SRI, TPMI, and antenna ports indicated in the DCI with the SRI, TPMI, and antenna ports of the one or more initial resource combinations configured through the RRC configuration.

Another exemplary user equipment (UE) is disclosed. The UE comprises a transceiver circuitry, a memory circuitry, and a processor circuitry. The transceiver, memory circuitry and processor circuitries are configured to receive a radio resource control (RRC) configuration from a network. The RRC configuration comprises configurations of one or more initial resource combinations supported by a configured grant uplink (UL) resource for initial transmission of data to the network. The transceiver, memory circuitry and processor circuitries are also configured to receive a schedule of the configured grant UL resource from the network, transmit the data on the configured grant UL resource to the network using the one or more initial resource combinations, and receive a downlink control information (DCI) from the network for retransmission of the data. The DCI includes a schedule of a retransmission UL resource. The transceiver, memory circuitry and processor circuitries are further configured to determine one or more retransmission resource combinations based on the DCI, and retransmit the data on the retransmission UL resource using the one or more retransmission resource combinations. The DCI indicates a plurality of resource combinations. Each initial resource combination and each retransmission resource combination includes a combination of resource parameters. The resource parameters include any one or more of a redundancy version (RV), a sounding reference signal (SRS) resource indicator (SRI), transmit precoding matrix indicator (TPMI), and antenna ports.

Another exemplary network node is disclosed. The network node comprises a transceiver circuitry, a memory circuitry, and a processor circuitry. The transceiver, memory circuitry and processor circuitries are configured to send a radio resource control (RRC) configuration to a user equipment (UE). The RRC configuration comprises configurations of one or more initial resource combinations supported by a configured grant uplink (UL) resource for initial transmission of data to the network. The transceiver, memory circuitry and processor circuitries are also configured to send a schedule of the configured grant UL resource to the UE, and send, upon an error in receiving the data on the configured grant UL resource from the UE using the one or more initial resource combinations, a downlink control information (DCI) to the UE for retransmission of the data. The DCI includes a schedule of a retransmission UL resource and indicates a plurality of resource combinations. The transceiver, memory circuitry and processor circuitries are further configured to receive the data on the retransmission UL resource from the UE using the one or more retransmission resource combinations. Each initial resource combination and each retransmission resource combination includes a combination of resource parameters. The resource parameters include any one or more of a redundancy version (RV), a sounding reference signal (SRS) resource indicator (SRI), transmit precoding matrix indicator (TPMI), and antenna ports.

Another exemplary user equipment (UE) is disclosed. The UE comprises means for receiving a radio resource control (RRC) configuration from a network. The RRC configuration comprises configurations of one or more initial resource combinations supported by a configured grant uplink (UL) resource for initial transmission of data to the network. The RRC configuration also comprises one or more interpretation rules to be applied by the UE for retransmission of the data to the network. The UE also comprises means for receiving a schedule of the configured grant UL resource from the network, means for transmitting the data on the configured grant UL resource to the network using the one or more initial resource combinations, and means for receiving a downlink control information (DCI) from the network for retransmission of the data. The DCI includes a schedule of a retransmission UL resource. The UE further comprises means for determining one or more retransmission resource combinations based on the one or more interpretation rules and the DCI, and means for retransmitting the data on the retransmission UL resource using the one or more retransmission resource combinations. Each initial resource combination and each retransmission resource combination includes a combination of resource parameters. The resource parameters includes any one or more of a sounding reference signal (SRS) resource indicator (SRI), a transmit precoding matrix indicator (TPMI), and antenna ports.

Another exemplary network node is disclosed. The network node comprises means for sending a radio resource control (RRC) configuration to a user equipment (UE). The RRC configuration comprises configurations of one or more initial resource combinations supported by a configured grant uplink (UL) resource for initial transmission of data from the UE to the network node. The RRC configuration also comprises one or more interpretation rules to be applied by the UE for retransmission of the data to the network node. The network node also comprises means for sending a schedule of the configured grant UL resource to the UE, and means for sending, upon an error in receiving the data on the configured grant UL resource from the UE using the one or more initial resource combinations, a downlink control information (DCI) to the UE for retransmission of the data, the DCI including a schedule of a retransmission UL resource. The network node further comprises means for receiving the data on the retransmission UL resource from the UE using the one or more retransmission resource combinations. Each initial resource combination and each retransmission resource combination includes a combination of resource parameters. The resource parameters includes any one or more of a sounding reference signal (SRS) resource indicator (SRI), a transmit precoding matrix indicator (TPMI), and antenna ports. The DCI indicates a combination of SRI, TPMI, and antenna ports. Further, the one or more interpretation rules specify to the UE that the one or more retransmission resource combinations are to be determined based on comparisons of the SRI, TPMI, and antenna ports indicated in the DCI with the SRI, TPMI, and antenna ports of the one or more initial resource combinations configured through the RRC configuration.

Another exemplary user equipment (UE) is disclosed. The UE comprises means for receiving a radio resource control (RRC) configuration from a network. The RRC configuration comprises configurations of one or more initial resource combinations supported by a configured grant uplink (UL) resource for initial transmission of data to the network. The UE also comprises means for receiving a schedule of the configured grant UL resource from the network, means for transmitting the data on the configured grant UL resource to the network using the one or more initial resource combinations, and means for receiving a downlink control information (DCI) from the network for retransmission of the data. The DCI includes a schedule of a retransmission UL resource. The UE further comprises means for determining one or more retransmission resource combinations based on the DCI, and means for retransmitting the data on the retransmission UL resource using the one or more retransmission resource combinations. The DCI indicates a plurality of resource combinations. Each initial resource combination and each retransmission resource combination includes a combination of resource parameters. The resource parameters include any one or more of a redundancy version (RV), a sounding reference signal (SRS) resource indicator (SRI), transmit precoding matrix indicator (TPMI), and antenna ports.

Another exemplary network node is disclosed. The network node comprises means for sending a radio resource control (RRC) configuration to a user equipment (UE). The RRC configuration comprises configurations of one or more initial resource combinations supported by a configured grant uplink (UL) resource for initial transmission of data to the network. The network node also comprises means for sending a schedule of the configured grant UL resource to the UE, and means for sending, upon an error in receiving the data on the configured grant UL resource from the UE using the one or more initial resource combinations, a downlink control information (DCI) to the UE for retransmission of the data. The DCI includes a schedule of a retransmission UL resource and indicates a plurality of resource combinations. The network node further comprises means for receiving the data on the retransmission UL resource from the UE using the one or more retransmission resource combinations. Each initial resource combination and each retransmission resource combination includes a combination of resource parameters. The resource parameters include any one or more of a redundancy version (RV), a sounding reference signal (SRS) resource indicator (SRI), transmit precoding matrix indicator (TPMI), and antenna ports.

A non-transitory computer-readable medium storing computer-executable instructions for a user equipment (UE) is disclosed. The executable instructions comprise one or more instructions causing the UE to receive a radio resource control (RRC) configuration from a network. The RRC configuration comprises configurations of one or more initial resource combinations supported by a configured grant uplink (UL) resource for initial transmission of data to the network. The RRC configuration also comprises one or more interpretation rules to be applied by the UE for retransmission of the data to the network. The executable instructions also comprise one or more instructions causing the UE to receive a schedule of the configured grant UL resource from the network, transmit the data on the configured grant UL resource to the network using the one or more initial resource combinations, and receive a downlink control information (DCI) from the network for retransmission of the data. The DCI includes a schedule of a retransmission UL resource. The executable instructions further comprise one or more instructions causing the UE to determine one or more retransmission resource combinations based on the one or more interpretation rules and the DCI, and retransmit the data on the retransmission UL resource using the one or more retransmission resource combinations. Each initial resource combination and each retransmission resource combination includes a combination of resource parameters. The resource parameters includes any one or more of a sounding reference signal (SRS) resource indicator (SRI), a transmit precoding matrix indicator (TPMI), and antenna ports.

A non-transitory computer-readable medium storing computer-executable instructions for a network node is disclosed. The executable instructions comprise one or more instructions causing the network node to send a radio resource control (RRC) configuration to a user equipment (UE). The RRC configuration comprises configurations of one or more initial resource combinations supported by a configured grant uplink (UL) resource for initial transmission of data from the UE to the network node. The RRC configuration also comprises one or more interpretation rules to be applied by the UE for retransmission of the data to the network node. The executable instructions also comprise one or more instructions causing the network node to send a schedule of the configured grant UL resource to the UE, and send, upon an error in receiving the data on the configured grant UL resource from the UE using the one or more initial resource combinations, a downlink control information (DCI) to the UE for retransmission of the data, the DCI including a schedule of a retransmission UL resource. The executable instructions further comprise one or more instructions causing the network node to receive the data on the retransmission UL resource from the UE using the one or more retransmission resource combinations. Each initial resource combination and each retransmission resource combination includes a combination of resource parameters. The resource parameters includes any one or more of a sounding reference signal (SRS) resource indicator (SRI), a transmit precoding matrix indicator (TPMI), and antenna ports. The DCI indicates a combination of SRI, TPMI, and antenna ports. Further, the one or more interpretation rules specify to the UE that the one or more retransmission resource combinations are to be determined based on comparisons of the SRI, TPMI, and antenna ports indicated in the DCI with the SRI, TPMI, and antenna ports of the one or more initial resource combinations configured through the RRC configuration.

Another non-transitory computer-readable medium storing computer-executable instructions for a user equipment (UE) is disclosed. The executable instructions comprise one or more instructions causing the UE to receive a radio resource control (RRC) configuration from a network. The RRC configuration comprises configurations of one or more initial resource combinations supported by a configured grant uplink (UL) resource for initial transmission of data to the network. The executable instructions also comprise one or more instructions causing the UE to receive a schedule of the configured grant UL resource from the network, transmit the data on the configured grant UL resource to the network using the one or more initial resource combinations, and receive a downlink control information (DCI) from the network for retransmission of the data. The DCI includes a schedule of a retransmission UL resource. The executable instructions further comprise one or more instructions causing the UE to determine one or more retransmission resource combinations based on the DCI, and retransmit the data on the retransmission UL resource using the one or more retransmission resource combinations. The DCI indicates a plurality of resource combinations. Each initial resource combination and each retransmission resource combination includes a combination of resource parameters. The resource parameters include any one or more of a redundancy version (RV), a sounding reference signal (SRS) resource indicator (SRI), transmit precoding matrix indicator (TPMI), and antenna ports.

Another non-transitory computer-readable medium storing computer-executable instructions for a network node is disclosed. The executable instructions comprise one or more instructions causing the network node to send a radio resource control (RRC) configuration to a user equipment (UE). The RRC configuration comprises configurations of one or more initial resource combinations supported by a configured grant uplink (UL) resource for initial transmission of data to the network. The executable instructions also comprise one or more instructions causing the network node to send a schedule of the configured grant UL resource to the UE, and send, upon an error in receiving the data on the configured grant UL resource from the UE using the one or more initial resource combinations, a downlink control information (DCI) to the UE for retransmission of the data. The DCI includes a schedule of a retransmission UL resource and indicates a plurality of resource combinations. The executable instructions further comprise one or more instructions causing the network node to receive the data on the retransmission UL resource from the UE using the one or more retransmission resource combinations. Each initial resource combination and each retransmission resource combination includes a combination of resource parameters. The resource parameters include any one or more of a redundancy version (RV), a sounding reference signal (SRS) resource indicator (SRI), transmit precoding matrix indicator (TPMI), and antenna ports.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
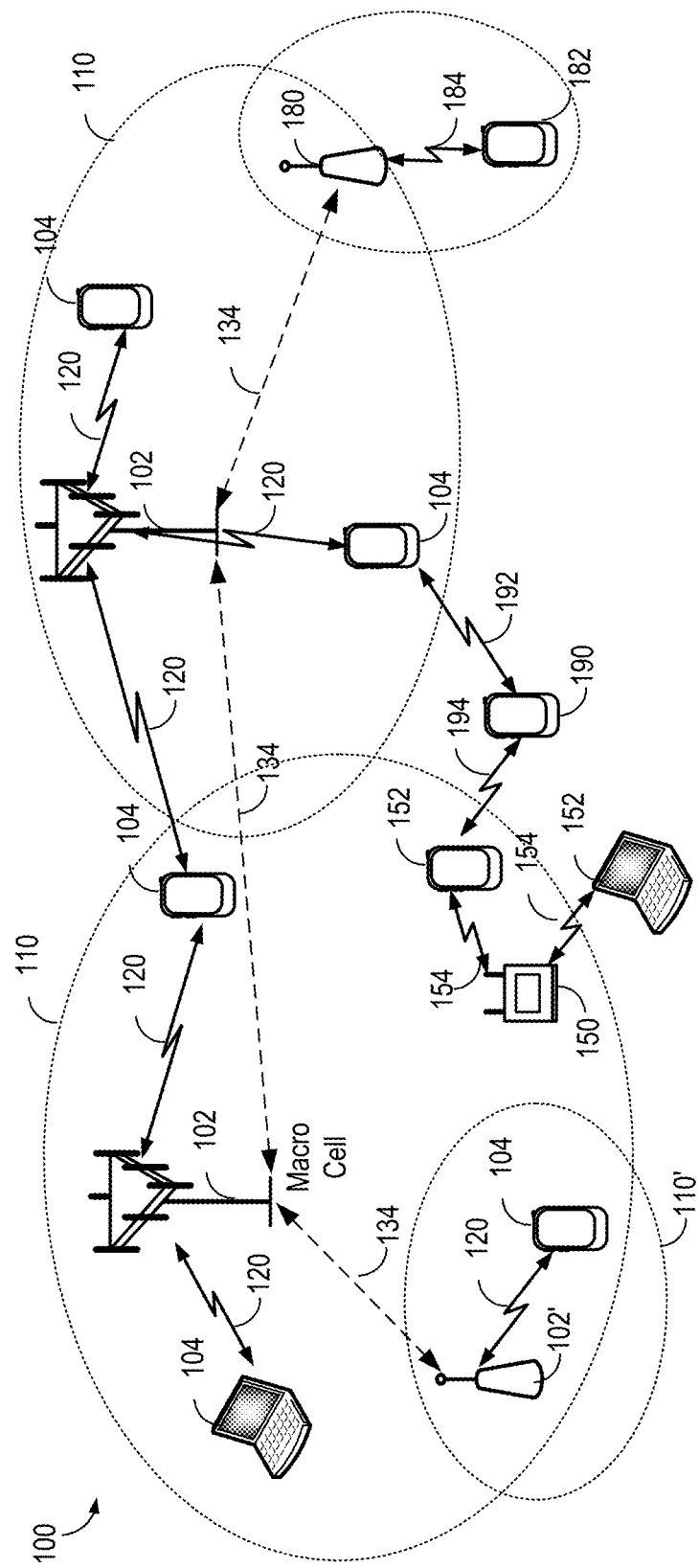
FIG. 1 illustrates an exemplary wireless communications system in accordance with one or more aspects of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an LTE network, gNodeBs (gNBs) where the wireless communications system 100 corresponds to a 5G network, and/or a combination thereof, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNodeBs, which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2:
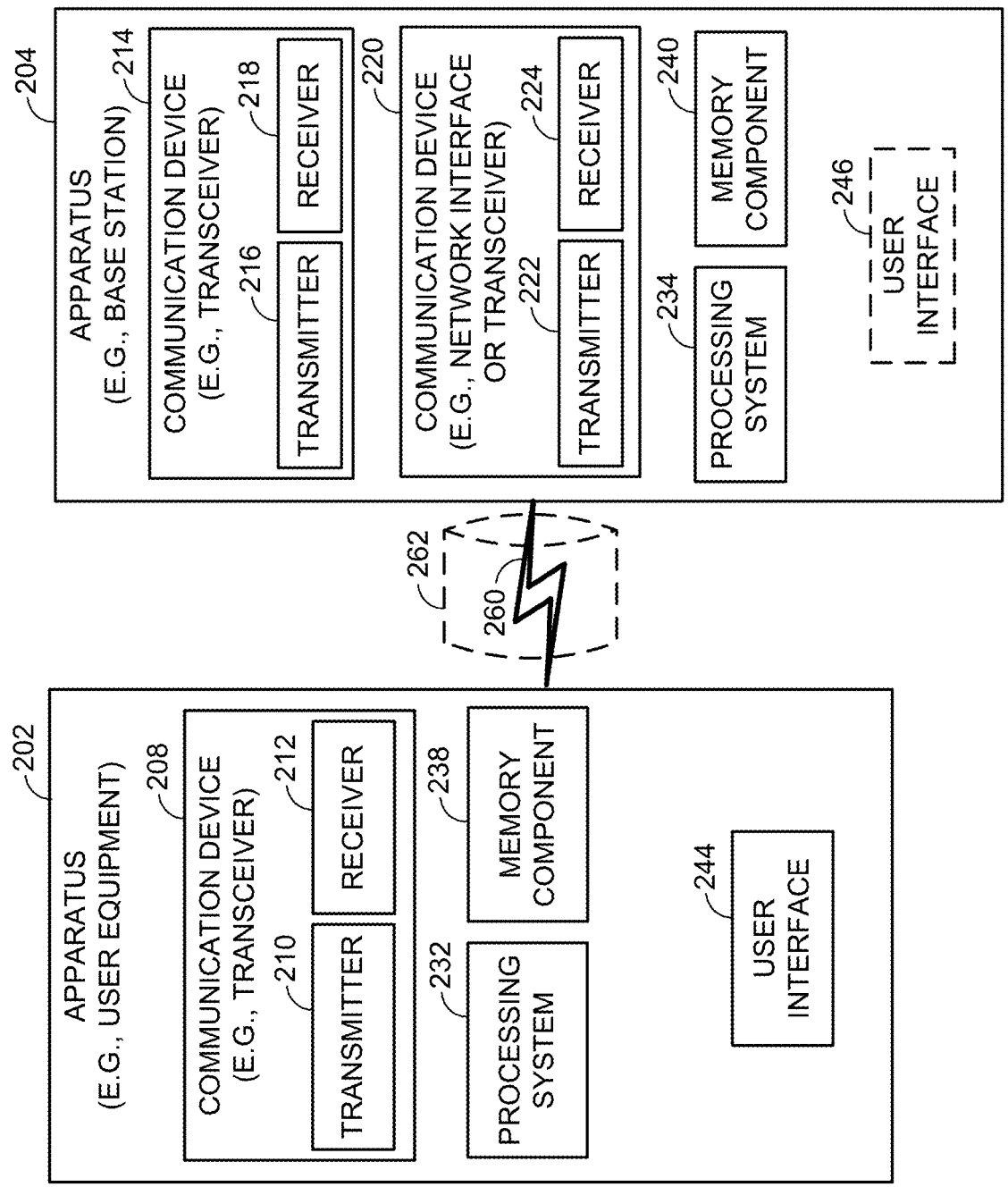
FIG. 2 is a simplified block diagram of several sample aspects of components that may be employed in wireless communication nodes and configured to support communication in accordance with one or more aspects of the disclosure.

FIG. 2 illustrates several sample components (represented by corresponding blocks) that may be incorporated into an apparatus 202 and an apparatus 204 (corresponding to, for example, a UE and a base station (e.g., eNB, gNB), respectively, to support the operations as disclosed herein. As an example, the apparatus 202 may correspond to a UE, and the apparatus 204 may correspond to a network node such as a gNB 222 and/or an eNB 224. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 202 and the apparatus 204 each may include at least one wireless communication device (represented by the communication devices 208 and 214) for communicating with other nodes via at least one designated RAT (e.g., LTE, 5G NR). Each communication device 208 may include at least one transmitter (represented by the transmitter 210) for transmitting and encoding signals (e.g., messages, indications, information, and so on) and at least one receiver (represented by the receiver 212) for receiving and decoding signals (e.g., messages, indications, information, pilots, and so on). Each communication device 214 may include at least one transmitter (represented by the transmitter 216) for transmitting signals (e.g., messages, indications, information, pilots, and so on) and at least one receiver (represented by the receiver 218) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 204 may also comprise a Network Listen Module (NLM) or the like for performing various measurements.

The apparatus 204 may include at least one communication device (represented by the communication device 220) for communicating with other nodes. For example, the communication device 220 may comprise a network interface (e.g., one or more network access ports) configured to communicate with one or more network entities via a wire-based or wireless backhaul connection. In some aspects, the communication device 220 may be implemented as a transceiver configured to support wire-based or wireless signal communication. This communication may involve, for example, sending and receiving messages, parameters, or other types of information. Accordingly, in the example of FIG. 2, the communication device 220 is shown as comprising a transmitter 222 and a receiver 224 (e.g., network access ports for transmitting and receiving).

The apparatuses 202 and 204 may also include other components used in conjunction with the operations as disclosed herein. The apparatus 202 may include a processing system 232 for providing functionality relating to, for example, communication with the network. The apparatus 204 may include a processing system 234 for providing functionality relating to, for example, communication with the UEs. In an aspect, the processing systems 232 and 234 may include, for example, one or more general purpose processors, multi-core processors, ASICs, digital signal processors (DSPs), field programmable gate arrays (FPGA), or other programmable logic devices or processing circuitry.

The apparatuses 202 and 204 may include memory components 238 and 240 (e.g., each including a memory device), respectively, for maintaining information (e.g., information indicative of reserved resources, thresholds, parameters, and so on). In addition, the apparatuses 202 and 204 may include user interface devices 244 and 246, respectively, for providing indications (e.g., audible and/or visual indications) to a user and/or for receiving user input (e.g., upon user actuation of a sensing device such a keypad, a touch screen, a microphone, and so on).

For convenience, the apparatuses 202 and 204 are shown in FIG. 2 as including various components that may be configured according to the various examples described herein. It will be appreciated, however, that the illustrated blocks may have different functionality in different designs.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 208, 232, 238, and 244 may be implemented by processor and memory component(s) of the apparatus 202 (e.g., by execution of appropriate code and/or by appropriate configuration of processor components). Similarly, some or all of the functionality represented by blocks 214, 220, 234, 240, and 246 may be implemented by processor and memory component(s) of the apparatus 204 (e.g., by execution of appropriate code and/or by appropriate configuration of processor components).

In an aspect, the apparatus 204 may correspond to a "small cell" or a Home gNodeB. The apparatus 202 may transmit and receive messages via a wireless link 260 with the apparatus 204, the messages including information related to various types of communication (e.g., voice, data, multimedia services, associated control signaling, etc.). The wireless link 260 may operate over a communication medium of interest, shown by way of example in FIG. 2 as the medium 262, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 204 and the apparatus 202 for the medium 262.

In general, the apparatus 202 and the apparatus 204 may operate via the wireless link 260 according to one or more radio access types, such as LTE, LTE-U, or 5G NR, depending on the network in which they are deployed. These networks may include, for example, different variants of CDMA networks (e.g., LTE networks, 5G NR networks, etc.), TDMA networks, FDMA networks, Orthogonal FDMA (OFDMA) networks, Single-Carrier FDMA (SC-FDMA) networks, and so on.

As mentioned above, conventionally, only a single TPMI with a single associated SRI is configured/activated for configured grant PUSCH transmission. During a PUSCH transmission with configured grant, the other part of the panels, which is not associated with the configured/indicated TPMI, will not be used.

To address this issue, Applicant has proposed solutions to enhance multi-panel UL multiple input multiple output (MIMO) transmission with configured grant filed as application PCT/CN2019/074829 entitled "DYNAMIC PHYSICAL UPLINK SHARED CHANNEL CONFIGURATION," which is hereby incorporated by reference in its entirety. For example, the network (NW) can configure multiple SRIs and associated TPMIs and antenna ports to the UE during the configured grant configuration/activation. The network can also configure multiple redundancy version (RV) indices, where each RV index corresponds to a configured TPMI and its associated SRI, and antenna ports. The UE may use each of the configured RV+TPMI+SRI+antenna-ports to transmit PUSCH using a certain part of the panels non-coherently, such that spatial diversity can be improved. In short, for a configured grant based PUSCH transmission, the network may enable the UE to do UL precoding using SPS-configured RV+TPMI+SRI+antenna port combinations.

The configured grant may be used for initial UL transmission. For example, the network may schedule the configured grant for the UE and the UE may use the scheduled PUSCH resources in the configured grant to transmit data to the network. However, in some instances, an error may occur during this initial UL transmission process (e.g., HARQ process may be invoked). For example, the network (e.g., base station, gNB, gNodeB, etc.) may not be able to fully decode the data transmitted by the UE. As another example, the UE may not have heard the network's request for data, and thus does not transmit data as the network expects. In such instances, the network schedules UL resources (PUSCH) for retransmission for the UE and notifies the UE through the DCI.

There are at least two cases to consider for retransmission. In a first case (case-A), the condition for retransmission may be worse than the condition for initial transmission. In case-A, if retransmission is scheduled by the network, the scheduled UL resource for the retransmission may not be suitable for the RV+TPMI+SRI+antenna-port combinations that have been SPS-configured for initial transmission:

Example A1: The configured grant PUSCH resources may be used only by the UEs carrying out UL transmissions, while the PUSCH resource for retransmission may also be used by both the retransmission UE and other UEs carrying out DL reception in a full-duplex system (due to the reason of resource limitation). In this instance, a certain part of the SPS-configured multiple SRI+TPMI+antenna-port combinations may cause spatial jamming towards the UEs carrying out DL reception.

Example A2: In the PUSCH resource for retransmission, a certain part of the SPS-configured multiple SRI+TPMI+antenna-port combinations may cause spatial interference to other UEs also carrying out UL transmissions, in a UL MU-MIMO scenario. In the configured grant PUSCH resource, such interference may not exist.

Alternatively, in a second case (case-B), the condition for retransmission may be better than the condition for initial transmission). In case-B, the configured grant PUSCH resources may only be suitable for less SRI+TPMI+antenna-port combinations (i.e., less panels transmitting simultaneously) due to interference/jamming limitations, while retransmission PUSCH resources may be suitable for more SRI+TPMI+antenna-port combinations (i.e., more panels transmitting simultaneously). In this case, the SPS-configured SRI+TPMI+antenna-port combinations for initial transmission may not be best in terms of performance for retransmission.

Example B1: The resource use may be reverted in comparison to Example A1.

Example B2: The resource use may be reverted in comparison to Example A2.

To address such issues, it is proposed to enable dynamic turn on/off/switch of panels (i.e., combinations of resource parameters) for retransmissions based on the multiple-SRI solutions. The resource parameters may be any one or more of resource related parameters such as RV, SRI, TPMI, antenna ports, bandwidth part (BWP), etc. The following solutions are proposed:

In a first solution (solution 1), it is proposed to reuse the existing downlink control information (DCI) for retransmission scheduling. In the existing DCI (e.g., Rel. 15 DCI), a DCI scheduling of a PUSCH retransmission only supports an indication of one SRI and one associated TPMI. To overcome this limitation of the existing DCI, new interpretation rules are proposed to enable dynamic indication of different SRI+TPMI+antenna-port switches. The interpretation rules may be provided from the network to the UE during radio resource configuration (RRC).

In the existing DCI, there is a limitation of SRI+TPMI+antenna-port numbers. As a result, case-A may be supported or case-B may be supported, but not both simultaneously with solution-1. This means that under solution-1, a fixed cased-A or case-B may be configured. However, this limitation can be overcome as explained further below In a second solution (solution 2), it is also proposed to reuse the existing downlink control information (DCI). However, the combination of RV+SRI+TPMI+antenna-port indicated in the DCI may be translated into a choice of RRC configured RV+SRI+TPMI+antenna-port combinations. In solution-2, the network may RRC configure multiple choices of RV+SRI+TPMI+antenna-port combinations, and activate one of them for the configured grant PUSCH transmission. For retransmission, an alternative choice index may be indicated via DCI, by jointly using the bits originally used for RV+SRI+TPMI+antenna-port indication. With solution-2, both case-A and case-B can be simultaneously supported.

In a third solution (solution 3), a new DCI format is proposed. If new DCI bits are allowed, both case-A and case-B can be simultaneously supported in a single DCI format without the fixed case-A or case-B SPS configuration.

In a fourth solution (solution 4), multiple bandwidth parts (BWPs) may be incorporated. The network may configure different panels to transmit PUSCH in different BWPs. This naturally leads to the extension of adding BWP in the configured combinations. As a result, dynamic switching of the BWP+RV+SRI+TPMI+antenna-port combinations can be carried out based on solutions-1, 2, and 3.

Each of the solutions are described in more detail. In discussing each of the solutions in detail, phrase "resource combination" will be used to refer to a combination of the resource parameters. That is, each resource combination may be a particular combination of resource-related parameters such as RV, SRI, TPMI, antenna ports, BWP, and so on.

Regarding solution 1, as mentioned above, it is proposed to reuse the existing DCI—e.g., Rel. 15 DCI (Format 0_1)—for retransmission. Solution 1 may be subdivided to solutions 1A and 1B (to address case-A and case-B, respectively). In solution 1A, the UL resource (i.e., configured grant) may support same or more SRIs than the retransmission resource. During RRC configuration, the network may configure the UE to transmit using UL resource that allows multiple resource combinations (e.g., multiple SRI+TPMI+antenna-port combinations) for initial transmission. The configured UL resource may be referred to as configured grant UL resource.

In other words, the network (e.g., network node such as a base station) may send an RRC configuration to the UE. The RRC configuration may comprise configurations of one or more resource combinations supported by the configured grant UL resource (e.g., PUSCH) for initial transmission of data from the UE to the network node. The configured grant UL resource may be semi-persistently scheduled. That is, the configured grant UL resource for initial transmission may be an SPS UL resource. The configured grant UL resource may support same or more resource combinations (e.g., same or more SRI+TPMI+antenna-port combinations) than the retransmission UL resource scheduled in the DCI for retransmission.

Also during RRC configuration, the network may configure interpretation rules to enable the UE to interpret the resource combination indication in the DCI. The following is a list of possible rules:

Rule 1A-1: If the resource combination SRI+TPMI+antenna-port indicated in the DCI is one of the existing SPS-configured resource combinations SRI+TPMI+antenna-port, the UE should: (1) mute the DCI indicated resource combination in the retransmission, and (2) use some or all other (i.e., at least one) SPS-configured resource combinations in the retransmission including transmitting the RV indicated in the DCI.

Rule 1A-2: If the resource combination SRI+TPMI+antenna-port indicated in the DCI is one of the existing SPS-configured resource combinations SRI+TPMI+antenna-port or is new (not any of the existing SPS-configured resource combinations SRI+TPMI+antenna-port), the UE should: (1) use the DCI indicated resource combination in the retransmission including transmitting the RV indicated in the DCI, and (2) ignore, for retransmission, all other SPS-configured resource combinations not indicated in the DCI.

Rule 1A-3: If the TPMI and/or the antenna port indicated in the DCI use reserved bit points, the UE should use the SPS-configured resource combination SRI+TPMI+antenna-port for in the retransmission including transmitting the RV indicated in the DCI. If there are multiple SPS-configured resource combinations SRI+TPMI+antenna-port, one or more SPS-configured resource combinations may be used in the retransmission.

In solution 1B, the SPS UL resource may support same or less SRIs than the retransmission resources. During RRC configuration, the network may configure the UE to transmit using UL resource that allows one or more resource combinations (e.g., one or more SRI+TPMI+antenna-port combinations) for initial transmissions. Again, the configured UL resource may be SPS UL resource. The configured UL resource may support same or less resource combinations (e.g., same or less SRI+TPMI+antenna-port combinations) than the UL resources scheduled in DCI for retransmission.

Also during RRC configuration, the network may configure interpretation rules to interpret the resource combination indication in the DCI. The following is a list of possible rules:

Rule 1B-1: If the resource combination SRI+TPMI+antenna-port indicated in the DCI is new (not any of the existing SPS-configured resource combinations SRI+TPMI+antenna-port), the UE should: (1) use the DCI indicated resource combination in the retransmission including transmitting the RV indicated in the DCI, and (2) use some or all (i.e., at least one) other SPS-configured resource combinations in the retransmission including transmitting the RV indicated in the DCI.

Rule 1B-2: If the resource combination SRI+TPMI+antenna-port indicated in the DCI is one of the existing SPS-configured resource combinations SRI+TPMI+antenna-port, the UE should: (1) use the DCI indicated resource combination in the retransmission including transmitting the RV indicated in the DCI, and (2) also use some or all (i.e., at least one) other SPS-configured resource combinations in the retransmission including transmitting the RV indicated in the DCI.

Rule 1B-3: If the TPMI and/or the antenna ports indicated in the DCI use reserved bit points, the UE should use the SPS-configured resource combination SRI+TPMI+antenna-port for in the retransmission including transmitting the RV indicated in the DCI. If there are multiple SPS-configured resource combinations SRI+TPMI+antenna-ports, one or more SPS-configured resource combinations may be used in the retransmission.

In solution 1A, a number of resource combinations for retransmission may be less than or equal to a number resource combination for original transmission. On the other hand, in solution 1B, the number of resource combinations for retransmission may be greater than or equal to the number resource combination for original transmission.

Solution 2 is similar to solution 1 in that the existing DCI—e.g., Rel. 15 DCI (Format 0_1)—is reused for retransmission. The two solutions differ in how the resource combination indicated in the DCI is interpreted. In solution-1, the manner of interpreting the parameters of the resource combination is not changed from the existing interpretation rules. That is, RV is still interpreted as RV, SRI is still interpreted as SRI, TMPI is still interpreted as TMPI, and so on.

But in solution 2, the DCI indicated resource combination may be interpreted to be an index. During RRC configuration, the network may configure the UE with multiple choices of resource combinations (e.g., multiple choices of RV+SRI+TPMI+antenna-port combinations), and each choice may include one or multiple resource combinations. It should be noted that some choices may include more SRIs than other choices. As such, both case-A and case-B may be simultaneously supported.

Also during RRC configuration, the network may configure interpretation rules to interpret the resource combination indication in the DCI. The following is a list of possible rules:

Rule 2-1: Interpret bits of any combination of SRI, TPMI, and antenna-ports indicated in the DCI as a choice index choosing one of the RRC configured choices of SRI+TMPI+antenna-port combinations. The UE should use some or all SPS-configured resource combinations corresponding to the choice index in the retransmission including transmitting the RV indicated in the DCI.

Rule 2-2: Interpret bits of RV and any combination of SRI, TPMI, and antenna-ports indicated in the DCI as a choice index choosing one of the RRC configured choices of RV+SRI+TMPI+antenna-port combinations. The UE should use some or all SPS-configured resource combinations corresponding to the choice index in the retransmission.

Rule 2-3: If any of the parameters of the resource combination (e.g., RV, SRI, TMPI, antenna ports, BWP, etc.) indicated in the DCI use reserved bit points, the UE should interpret the resource combination indicated in the DCI under solution 1A and/or solution 1B. Different reserved bits may be used to specify between solution 1A and solution 1B.

It should be noted that any of the RV, SRI, TMPI, antenna ports, etc. may be excluded if the bits of the other parameters are sufficient.

Solution 3 is unlike solutions 1 and 2 in that a DCI with alternative format is proposed. During RRC configuration, the network may configure the UE with any number of resource combinations (e.g., one or more RV+SRI+TPMI+antenna-port combinations). But in solution 3, the DCI may also indicate any number of resource combinations. That is, the DCI may indicate one or a plurality of resource combinations (e.g., one or more RV+SRI+TPMI+antenna-port combinations). The configured UL resource (e.g., configured SPS UL resource) may support less, more, or same number of SRIs than the UL resources scheduled in DCI for retransmission.

Solution 3 may be subdivided into solutions 3A and 3B. In solution 3A, if any of the indicated resource combination use reserved bits of the parameters (e.g., reserved bits of TPMI and/or antenna ports), that resource combination may be ignored for retransmission. The UE may use some or all other resource combinations in the retransmission.

In solution 3B, a number of resource combinations (e.g., number of RV+SRI+TPMI+antenna-port combinations) supported in the UL retransmission resource—denoted by N—may be indicated in the DCI and/or configured during the RRC configuration and/or preconfigured in the UE. In this instance, if the number of resource combinations indicated in the DCI is N or greater, the UE may use N of the indicated combinations (e.g., first N) for retransmission, and the remaining combinations may be ignored. If the number of resource combinations indicated in the DCI is less than N, the UE may use all of the indicated resource combinations.

Solution 4 may be viewed as an option extension to any of solutions 1, 2, and 3. In solution 4, during RRC configuration, the network may configure each resource combinations to include a bandwidth part (BWP) indicator. That is, one or more resource combinations (e.g., one or more RV+SRI+TPMI+antenna-ports+BWP combinations) may be configured.

For retransmission scheduling, interpretation rules of solutions 1, 2, and 3 may be modified to account for the BWP indicated in the DCI. For example, in solution 1 based approaches (reuse of existing DCI), the BWP indicated in the DCI may be considered in addition to SRI+TPMI+antenna-ports in determining which resource combination or combinations will be used in retransmission. In solution 2 based approaches (reuse of existing DCI), the BWP may be included in the consideration of determining the choice index. In solution 3 based approaches (define new DCI format), multiple combinations of RV+SRI+TPMI+antenna-ports+BWP may be indicated in the DCI.

The following should be noted. If the existing DCI is reused, then for both solutions 1 and 2, it may be assumed that the resource allocation in the DCI scheduling the retransmission can be applied to all scheduled BWPs. If a new DCI format is allowed, then for solution 3, different resource allocations can be indicated for different BWPs in the DCI scheduling the retransmission.

Figure 3:
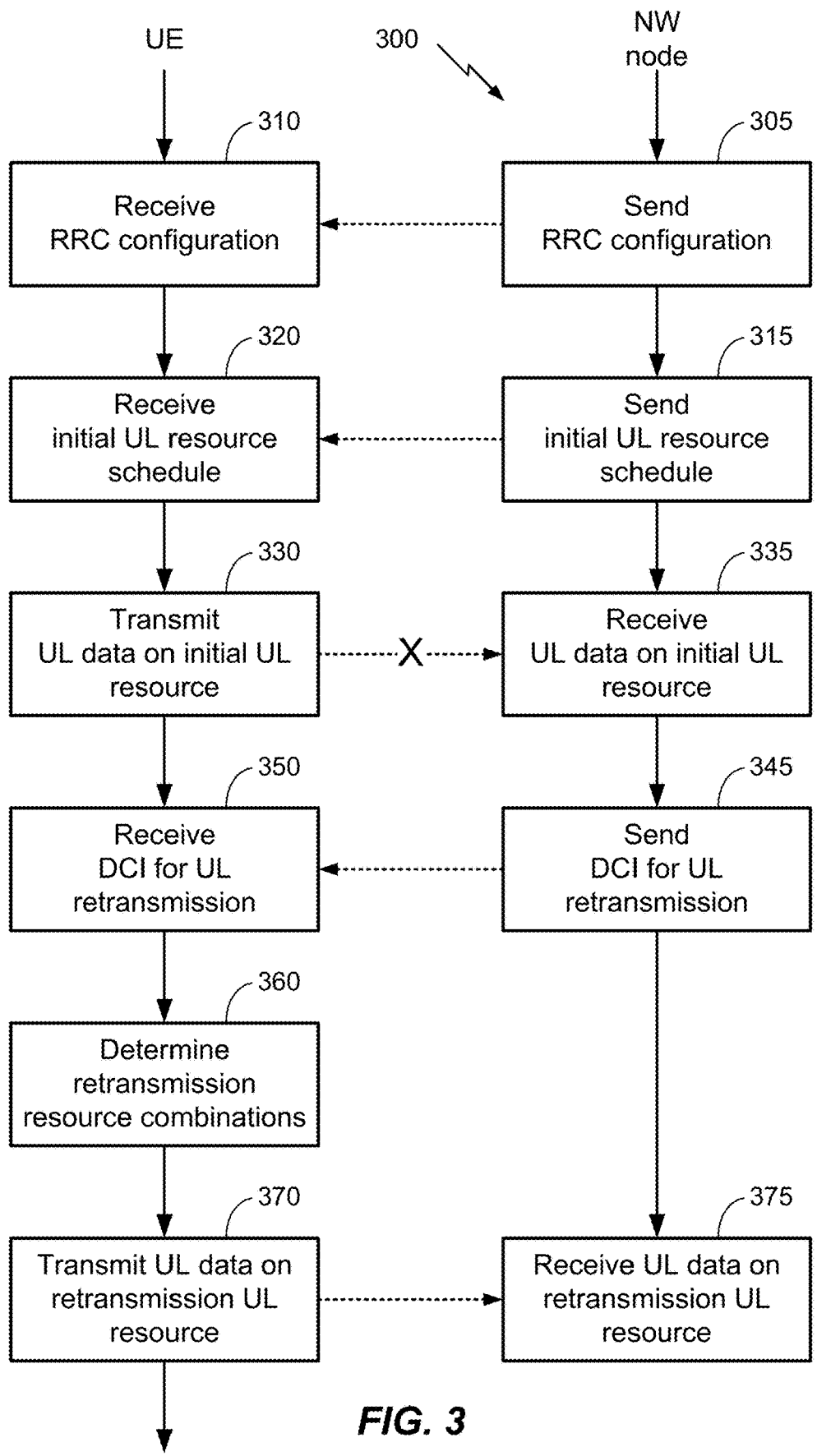
FIG. 3 illustrates an exemplary method performed by a UE and a network node to communicate with each other in accordance with one or more aspects of the disclosure.

FIG. 3 illustrates an exemplary method 300 performed by a UE and a network node (e.g., base station such as gNB, eNB) to communicate with each other. The UE may be a multi-panel UE. At block 305, the network node may send an RRC configuration to the UE, and at block 310, the UE may receive the RRC configuration (denoted by dashed arrow from block 305 to block 310).

Recall from above that during the RRC configuration, the network may configure one or more resource combinations supported by the UL resource for initial transmission of data from the UE to the network. That is, one or more of the panels of the UE may be configured for uplink transmission. For ease of reference, the resource combinations configured in the UE according to the RRC configuration will be referred to as "initial" resource combinations and the UL resource (e.g., PUSCH) for the initial transmission will be referred to as the "configured grant" UL resource. It can then be said that the RRC configuration may comprise configurations of one or more resource combinations supported by the configured grant UL resource for initial transmission of data from the UE to the network node. In an aspect, each initial resource combination may correspond to one of the panels of the UE.

Each initial resource combination may include any combination of resource parameters such as any combination of SRI, TPMI, and antenna ports. RV and/or BWP may also be included. In the RRC configuration, each initial resource combination may be different from each of the other initial resource combinations. In an aspect, first and second resource combination may be considered to be different when a value of at least one resource parameter of the first resource combination is different from a value of the same at least one resource parameter of the second resource combination.

At block 315, the network node may send a schedule of the configured grant UL resource (e.g., PUSCH) to the UE, and at block 320, the UE may receive the schedule (denoted by dashed arrow from block 315 to block 320).

At block 330, the UE may send data on the configured grant UL resource to the network node using the one or more initial resource combinations. To state it another way, the UE may send the data on the configured grant UL resource via one or more panels corresponding to the one or more initial resource combinations.

However, in this instance, it is assumed that an error occurs for the initial UL transmission (denoted by X through dashed arrow from block 330 to block 335). For example, the network may receive the data at block 335 but is unable to decode, or the network node may not receive the data at all due to severe interference.

Upon the error in receiving the data from the UE, at block 345, the network node may send the DCI to the UE for retransmission of the data. At block 350, the UE may receive the DCI (denoted by a dashed arrow from block 345 to 350. The DCI may include a schedule of a UL resource for retransmission. For ease of reference, the UL resource (e.g., PUSCH) for the retransmission will be referred to as "retransmission" UL resource. It can then be said that the DCI includes a schedule of the retransmission UL resource.

At block 360, the UE may determine one or more resource combinations for retransmission based on the interpretation rules and the DCI. For ease of reference, the resource combinations determined by the UE for retransmission will be referred to as "retransmission" resource combinations. In an aspect, each retransmission resource combination may correspond to one of the panels of the UE.

At block 370, the UE may retransmit the data, and at block 375, the network may receive the retransmitted data (denoted by dashed arrow from block 370 to block 375). That is, the UE may transmit the data on the retransmission UL resource using the one or more using the one or more retransmission resource combinations, and the network node may receive the data on the retransmission UL.

As noted, the UE in block 360 may determine the retransmission resource combinations used to retransmit the data. It can be desirable to reuse the existing DCI (e.g., reuse the Rel. 15 DCI) to maximize compatibility with existing techniques. To optimize uplink precoding, it is proposed to enhance how the information contained in the DCI is interpreted to determine the retransmission resource combinations.

Thus, in an aspect, the RRC configuration received from the network may also include one or more interpretation rules to be applied by the UE for retransmission of the data to the network (e.g., any of the rules of solutions 1, 2, 3 and/or 4 described above). In one aspect, the interpretation rules may specify that the UE determine the retransmission resource combinations based on a comparison between information included in the DCI and the initial resource combinations configured through the RRC configuration. This corresponds to solution 1 described above.

For example, the DCI may indicate a combination of the SRI, TPMI, and antenna ports. The interpretation rules may specify that the retransmission resource combinations be determined based on a comparison of the indicated SRI, TPMI, and antenna ports parameters with the same parameters of the initial resource combinations.

Unlike the conventional technique which completely ignores the initial resource combinations, the proposed technique allows the possibility of having the retransmission resource combinations include at least some of the initial resource combinations. In other words, the initial resource combinations may be reused. Another advantage is that unlike the conventional technique uses only one panel for retransmission, the proposed technique allows the possibility of multiple panels being used for the retransmission. This in turn enhances the likelihood that the retransmission will be successful.

In an aspect, the RV provided in the DCI may be included in the retransmission. That is, in an aspect, the chosen panels (the determined retransmission resource combinations) all may transmit the same RV included in the DCI.

When case-A applies (i.e., when the configured grant UL resource supports same or more SRIs than the retransmission UL resource), the interpretation rules may specify any one or more of the rules 1A-1, 1A-2, and 1A-3 described above. Rule 1A-1 may be rephrased to indicate that when the combination of the SRI, TPMI, and antenna ports parameters indicated in the DCI matches a combination of SRI, TPMI, and antenna ports of one of the initial resource combinations, the matching initial resource combination may be muted (i.e., not used), and all other initial resource combinations may be included in the retransmission resource combinations. Again, matching indicates that the values of the parameters SRI, TPMI, and antenna ports of the DCI match the values of the same parameters of the initial resource combination.

Rule 1A-2 may be rephrased to indicate that when the combination of SRI, TPMI, and antenna ports indicated in the DCI does not match the combination of SRI, TPMI, and antenna ports of any of the initial resource combinations, all of the initial resource combinations may be excluded from being included in the retransmission resource combinations. Rule 1A-3 may be rephrased to indicate that when one or more reserved bits of any of the SRI, TPMI, and antenna ports indicated in the DCI are used, all of the initial resource combinations may be included in the retransmission resource combinations.

When case-B applies (i.e., when the configured grant UL resource supports same or less SRIs than the retransmission UL resource), the interpretation rules may specify any one or more of the rules 1B-1, 1B-2, and 1B-3 described above. Rule 1B-1 may be rephrased to indicate that when the combination of SRI, TPMI, and antenna ports indicated in the DCI does not match a combination of SRI, TPMI, and antenna ports of any of the initial resource combination, the combination of SRI, TPMI, and antenna ports indicated in the DCI and at least one of the initial resource combination may be included in the retransmission resource combinations.

Rule 1B-2 may be rephrased to indicate that when the combination of SRI, TPMI, and antenna ports indicated in the DCI does match the combination of SRI, TPMI, and antenna ports of any of the initial resource combination, the matching initial resource combination may be included in the one or more retransmission resource combinations. If there are multiple initial resource combinations, at least one of the other initial resource combination may also be included in the retransmission resource combinations. Rule 1B-3 may be rephrased to indicate that when one or more reserved bits of any of SRI, TPMI, and antenna ports indicated in the DCI are used, all of the initial resource combinations may be included in the retransmission resource combinations. IF the RV and/or BWP are included as parameters of the resource combinations, then each of the rules 1A-1, 1A-2, 1A-3, 1B-1, 1B-2, and 1B-3 may be modified accordingly to account for the RV and/or the BWP.

In another aspect, the RRC configuration received from the network may comprise configuration of multiple choices of initial resource combinations in which each choice includes one or more initial resource combinations supported by the configured grant UL resource (see solution 2 above). In this instance, the interpretation rules may specify that any one or more of the SRI, TPMI, and antenna ports indicated in the DCI be interpreted as a choice index choosing one of the multiple choices of the initial resource combinations such that the initial resource combinations corresponding to the choice index are included in the retransmission resource combinations. Any of the bits of any of these parameters may be excluded if the remaining bits are sufficient to serve as the choice index. The RV indicated in the DCI may be included in the retransmission using the chosen retransmission resource combinations.

Alternatively or in addition thereto, RV may also be used in interpreting the choice index. That is, the rules may specify that a combination of the RV and any one or more of the SRI, TPMI, and antenna ports be interpreted as the choice index. IF the BWP is included, then the interpreting the choice index may be modified accordingly to account for the BWP.

In another alternative or in addition thereto, is any of the reserved bits of the resource parameters are used, then the parameters indicated in the DCI may be interpreted according to any of the rules 1A-1, 1A-2, 1A-3, 1B-1, 1B-2, and 1B-3. Indeed, some of the reserved bits may be used to indicate whether case-A or case-B applies, and the UE may apply the interpretation rules accordingly. For example, a group of one more reserved bits of the resource parameters (any one or more of SRI, TMPI, antenna ports, RV, BWP, etc.)—referred to as the "reserved big group" may be used to indicate whether a first retransmission condition (e.g., case-A) or a second retransmission condition (e.g., case-B) applies.

For both transmission conditions, the interpretation rules 1A-1, 1A-2, 1A-3, 1B-1, 1B-2, and 1B-3 may be modified to exclude the reserved bit group from comparison. For example, the modified rule 1A-1 may be phrased to indicate that when the combination of the SRI, TPMI, and antenna ports parameters indicated in the DCI other than the reserved bit group matches a combination of SRI, TPMI, and antenna ports of one of the initial resource combinations, the matching initial resource combination may be muted, and all other initial resource combinations may be included in the retransmission resource combinations. As another example, the modified rule 1B-3 may be phrased to indicate that when one or more reserved bits of any of SRI, TPMI, and antenna ports indicated in the DCI other than the reserved bit group are used, all of the initial resource combinations may be included in the retransmission resource combinations. IF the RV and/or BWP are included as parameters of the resource combinations, then each of the rules 1A-1, 1A-2, 1A-3, 1B-1, 1B-2, and 1B-3 may be further modified accordingly.

While using the existing DCI is beneficial, the limitations of the existing DCI are still recognized. Therefore, in another aspect, a new DCI format is proposed (see solution 3 above). In the new DCI format, multiple resource combinations may be included. Then with the new DCI, block 360 becomes relatively simple to implement. For example, the DCI from the network may indicate a plurality of resource combinations. Then in block 360, the UE may include one or more of the plurality of resource combinations indicated in the DCI as the retransmission resource combinations.

If any of the resource combinations indicated in the DCI use any reserved bits of any of the resource parameters (e.g., reserved bits of TPMI and/or antenna ports), that resource combination may be ignored for retransmission. The UE may use some or all other resource combinations in the retransmission. Also if the retransmission UL resource supports a limited number N of resource combinations (N≥1), that number of resource combinations indicated in the DCI may be included in the retransmission resource combinations.

Figure 4:
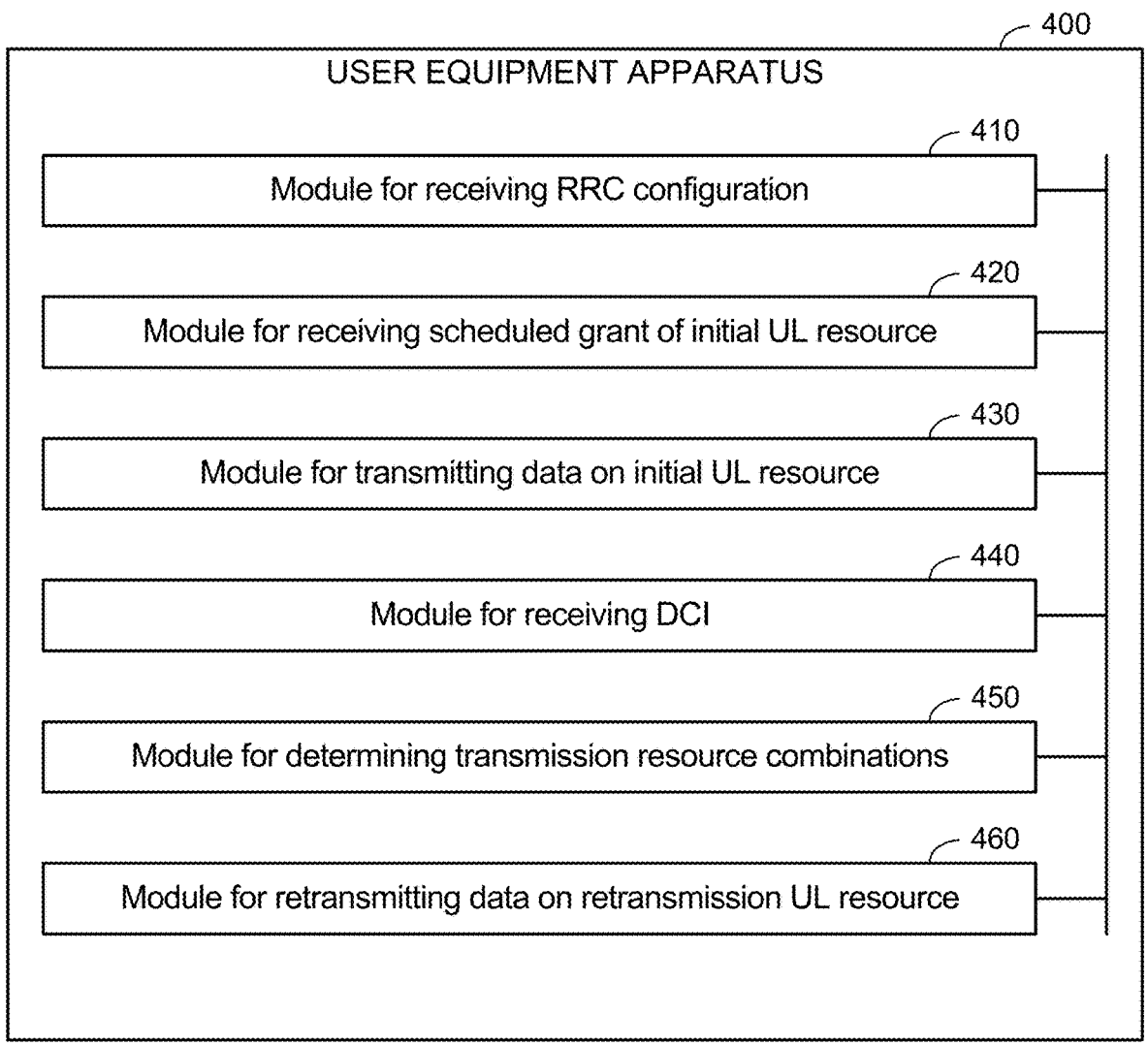
FIGS. 4 and 5 illustrate simplified block diagrams of several sample aspects of apparatuses configured to support RTT positioning.

FIG. 4 illustrates an example user equipment apparatus 400 represented as a series of interrelated functional modules connected by a common bus. Each of the modules may be implemented in hardware or as a combination of hardware and software. For example, the modules may be implemented as any combination of the modules of the apparatus 202 of FIG. 2. A module for receiving RRC configuration 410 may correspond at least in some aspects to a communication device, such as the communication device 208 and/or a processing system, such as processing system 232. A module for receiving scheduled grant of the configured grant UL resource 420 may correspond at least in some aspects to a communication device, such as the communication device 208 and/or a processing system, such as processing system 232. A module for transmitting data on configured grant UL resource 430 may correspond at least in some aspects to a communication device, such as the communication device 208 and/or a processing system, such as processing system 232. A module for receiving DCI 440 may correspond at least in some aspects to a communication device, such as the communication device 208 and/or a processing system, such as processing system 232. A module for determining transmission resource combinations 450 may correspond at least in some aspects to a processing system, such as processing system 232. A module for retransmitting data on retransmission UL resource 460 may correspond at least in some aspects to a communication device, such as the communication device 208 and/or a processing system, such as processing system 232.

Figure 5:
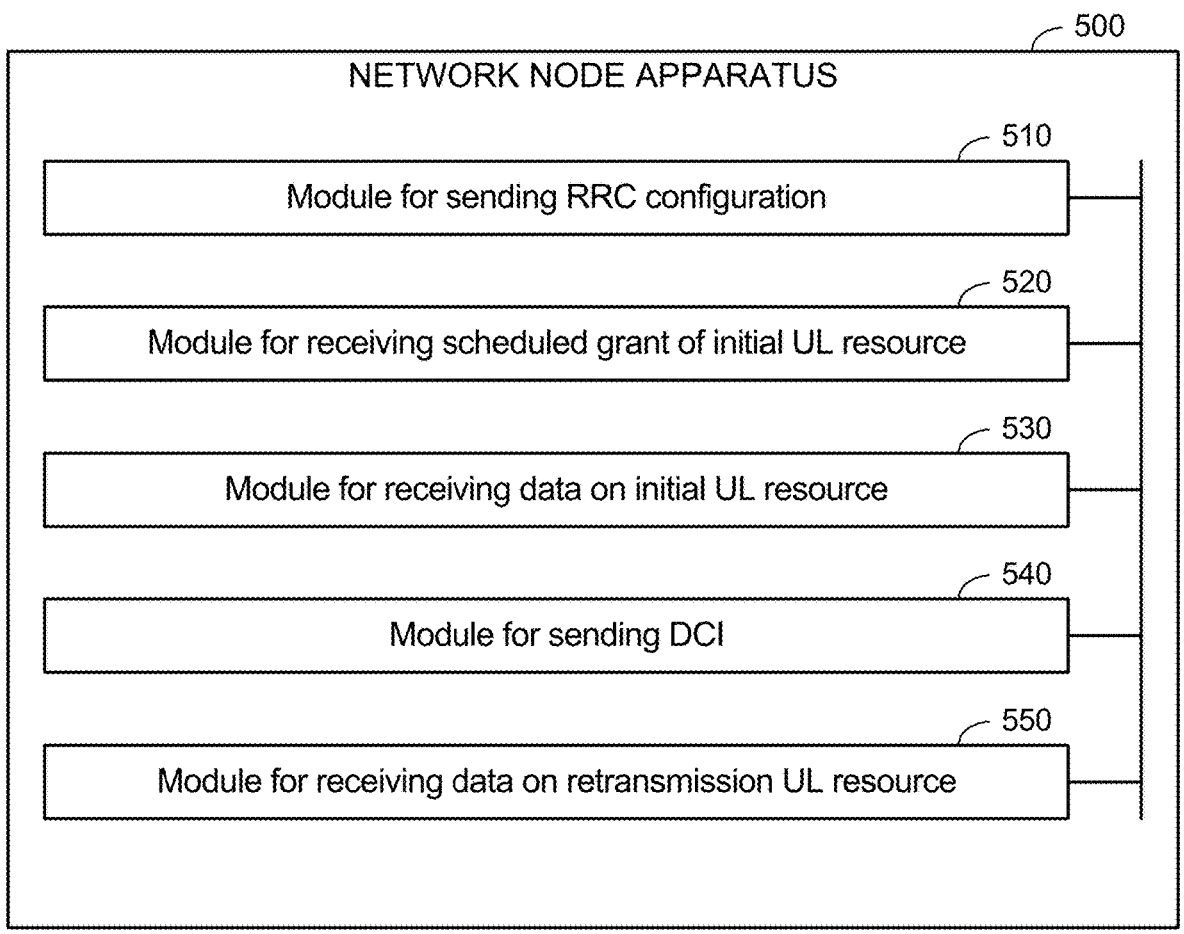

FIG. 5 illustrates an example network node apparatus 500 represented as a series of interrelated functional modules connected by a common bus. Each of the modules may be implemented in hardware or as a combination of hardware and software. For example, the modules may be implemented as any combination of the modules of the apparatus 204 of FIG. 2. A module for sending RRC configuration 510 may correspond at least in some aspects to a communication device, such as the communication device 214 and/or a processing system, such as processing system 234. A module for sending scheduled grant of the configured grant UL resource 520 may correspond at least in some aspects to a communication device, such as the communication device 214 and/or a processing system, such as processing system 234. A module for receiving data on the configured grant UL resource 530 may correspond at least in some aspects to a communication device, such as the communication device 214 and/or a processing system, such as processing system 234. A module for sending DCI 540 may correspond at least in some aspects to a communication device, such as the communication device 214 and/or a processing system, such as processing system 234. A module for receiving data on the retransmission UL resource 550 may correspond at least in some aspects to a communication device, such as the communication device 214 and/or a processing system, such as processing system 234.

The functionality of the modules of FIGS. 4 and 5 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 4 and 5, as well as other components and functions described herein, may be implemented using any suitable means. Such means also may be implemented, at least in part, using corresponding structure as taught herein. For example, the components described above in conjunction with the "module for" components of FIGS. 4 and 5 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a user equipment (UE), the method comprising:
receiving a radio resource control (RRC) configuration from a network, the RRC configuration comprising
configurations of one or more initial resource combinations supported by a configured grant uplink (UL) resource for initial transmission of data to the network, and
one or more interpretation rules to be applied by the UE for retransmission of the data to the network;
receiving a schedule of the configured grant UL resource from the network;
transmitting the data on the configured grant UL resource to the network using the one or more initial resource combinations;
receiving a downlink control information (DCI) from the network for retransmission of the data, the DCI including a schedule of a retransmission UL resource;
determining one or more retransmission resource combinations based on the one or more interpretation rules and the DCI; and
retransmitting the data on the retransmission UL resource using the one or more retransmission resource combinations,
wherein each initial resource combination and each retransmission resource combination includes a combination of resource parameters including any one or more of a sounding reference signal (SRS) resource indicator (SRI), a transmit precoding matrix indicator (TPMI), and antenna ports, wherein the DCI indicates a combination of SRI, TPMI, and antenna ports, and
wherein the one or more interpretation rules specify that the one or more retransmission resource combinations be determined based on comparisons of the SRI, TPMI, and antenna ports indicated in the DCI with the SRI, TPMI, and antenna ports of the one or more initial resource combinations configured through the RRC configuration.

2. The method of claim 1,
wherein a redundancy version (RV) indicated in the DCI is included in the retransmission.

3. The method of claim 2,
wherein the configured grant UL resource is configured to support same or more SRIs than the retransmission UL resource, and
wherein the one or more interpretation rules specify that
when the combination of SRI, TPMI, and antenna ports indicated in the DCI matches a combination of SRI, TPMI, and antenna ports of one of the initial resource combinations configured through the RRC configuration, the matching initial resource combination is muted, and all other initial resource combinations are included in the one or more retransmission resource combinations,
when the combination of SRI, TPMI, and antenna ports indicated in the DCI does not match the combination of SRI, TPMI, and antenna ports of any of the initial resource combinations configured through the RRC configuration, all of the initial resource combinations are excluded from the one or more retransmission resource combinations, and
when one or more reserved bits of any of SRI, TPMI, and antenna ports indicated in the DCI are used, all of the initial resource combinations are included in the one or more retransmission resource combinations.

4. The method of claim 3,
wherein the resource parameters also include a bandwidth part (BWP),
wherein the DCI also indicates the BWP, and
wherein the one or more interpretation rules specify that
when a combination of SRI, TPMI, antenna ports, and BWP indicated in the DCI matches a combination of SRI, TPMI, antenna ports, and BWP of one of the initial resource combination configured through the RRC configuration, the matching initial resource combination is muted, and all other initial resource combinations are included in the one or more retransmission resource combinations,
when the combination of SRI, TPMI, antenna ports, and BWP indicated in the DCI does not match the combination of SRI, TPMI, antenna ports, and BWP of any of the initial resource combination configured through the RRC configuration, all of the initial resource combinations are excluded from the one or more retransmission resource combinations, and
when one or more reserved bits of any of SRI, TPMI, antenna ports, and BWP indicated in the DCI are used, all of the initial resource combinations are included in the one or more retransmission resource combinations.

5. The method of claim 2,
wherein the configured grant UL resource is configured to support same or less SRIs than the retransmission UL resource, and
wherein the one or more interpretation rules specify that
when the combination of SRI, TPMI, and antenna ports indicated in the DCI does not match a combination of SRI, TPMI, and antenna ports of any of the one or more initial resource combination configured through the RRC configuration, the combination of SRI, TPMI, and antenna ports indicated in the DCI and at least one of the initial resource combination are included in the one or more retransmission resource combinations,
when the combination of SRI, TPMI, and antenna ports indicated in the DCI does match the combination of SRI, TPMI, and antenna ports of any of the initial resource combination configured through the RRC configuration, the matching initial resource combination is included in the one or more retransmission resource combinations, and
when one or more reserved bits of any of SRI, TPMI, and antenna ports indicated in the DCI are used, all of the initial resource combinations are included in the one or more retransmission resource combinations.

6. The method of claim 5, wherein the one or more interpretation rules specify that when the combination of SRI, TPMI, and antenna ports indicated in the DCI does match the combination of SRI, TPMI, and antenna ports of any of the initial resource combination configured through the RRC configuration and when there are multiple initial resource combinations, at least one of the other initial resource combination is also included in the one or more retransmission resource combinations.

7. The method of claim 5,
wherein the resource parameters also include a bandwidth part (BWP),
wherein the DCI also indicates the BWP, and
wherein the one or more interpretation rules specify that
when the combination of SRI, TPMI, antenna ports, and BWP indicated in the DCI does not match a combination of SRI, TPMI, antenna ports, and BWP of any of the one or more initial resource combination configured through the RRC configuration, the combination of SRI, TPMI, antenna ports, and BWP indicated in the DCI and at least one of the initial resource combination are included in the one or more retransmission resource combinations,
when the combination of SRI, TPMI, antenna ports, and BWP indicated in the DCI does match the combination of SRI, TPMI, antenna ports, and BWP of any of the initial resource combination configured through the RRC configuration, the matching initial resource combination is included in the one or more retransmission resource combinations, and
when one or more reserved bits of any of SRI, TPMI, antenna ports, and BWP indicated in the DCI are used, all of the initial resource combinations are included in the one or more retransmission resource combinations.

8. The method of claim 1,
wherein the RRC configuration comprises configuration of multiple choices of initial resource combinations with each choice including one or more initial resource combinations supported by the configured grant UL resource, and
wherein the one or more interpretation rules specify that a combination of any one or more of the SRI, TMPI, and antenna ports indicated in the DCI be interpreted as a choice index choosing one of the multiple choices of the initial resource combinations such that the initial resource combinations corresponding to the choice index are included in the one or more retransmission resource combinations.

9. The method of claim 8, wherein a redundancy version (RV) indicated in the DCI is included in the retransmission.

10. The method of claim 8,
wherein the RRC configuration is such that each initial resource combination includes the combination of resource parameters that includes a redundancy version (RV) in addition to the SRI, TMPI, and antenna ports, and
wherein the one or more interpretation rules specify that a combination of the RV and any one or more of the SRI, TPMI, and antenna ports indicated in the DCI be interpreted as the choice index.

11. The method of claim 8,
wherein the RRC configuration is such that each initial resource combination includes the combination of resource parameters that includes a bandwidth part (BWP) in addition to the SRI, TMPI, and antenna ports, and
wherein the choice index comprises the BWP and any one or more of the SRI, TPMI, and antenna ports indicated in the DCI.

12. The method of claim 8, wherein when a reserved bit group comprising one or more reserved bits of any of SRI, TPMI, and antenna ports indicated in the DCI are used, the one or more interpretation rules specify that the one or more retransmission resource combinations be determined
based on comparisons of the SRI, TPMI, and antenna ports indicated in the DCI with the SRI, TPMI, and antenna ports of the one or more initial resource combinations, and based on whether the reserved bit group indicates a first retransmission condition or a second transmission condition.

13. The method of claim 12, wherein when the reserved bit group indicates the first transmission condition, the one or more interpretation rules specify that when the combination of SRI, TPMI, and antenna ports indicated in the DCI other than the reserved bit group matches a combination of SRI, TPMI, and antenna ports of one of the initial resource combinations configured through the RRC configuration, the matching initial resource combination is muted, and all other initial resource combinations are included in the one or more retransmission resource combinations, when the combination of SRI, TPMI, and antenna ports indicated in the DCI other than the reserved bit group does not match the combination of SRI, TPMI, and antenna ports of any of the initial resource combinations configured through the RRC configuration, all of the initial resource combinations are excluded from the one or more retransmission resource combinations, and when one or more reserved bits of any of SRI, TPMI, and antenna ports indicated in the DCI other than the reserved bit group are used, all of the initial resource combinations are included in the one or more retransmission resource combinations.

14. The method of claim 12, wherein when the reserved bit group indicates the second transmission condition, the one or more interpretation rules specify that when the combination of SRI, TPMI, and antenna ports indicated in the DCI other than the reserved bit group does not match a combination of SRI, TPMI, and antenna ports of any of the one or more initial resource combination configured through the RRC configuration, the combination of SRI, TPMI, and antenna ports indicated in the DCI and at least one of the initial resource combination are included in the one or more retransmission resource combinations, when the combination of SRI, TPMI, and antenna ports indicated in the DCI other than the reserved bit group does match the combination of SRI, TPMI, and antenna ports of any of the initial resource combination configured through the RRC configuration, the matching initial resource combination is included in the one or more retransmission resource combinations, and when one or more reserved bits of any of SRI, TPMI, and antenna ports indicated in the DCI other than the reserved bit group are used, all of the initial resource combinations are included in the one or more retransmission resource combinations.

15. A method performed by a network node, the method comprising:

sending a radio resource control (RRC) configuration to a user equipment (UE), the RRC configuration comprising
configurations of one or more initial resource combinations supported by a configured grant uplink (UL) resource for initial transmission of data from the UE to the network node, and
one or more interpretation rules to be applied by the UE for retransmission of the data to the network node;

sending a schedule of the configured grant UL resource to the UE;

sending, upon an error in receiving the data on the configured grant UL resource from the UE using the one or more initial resource combinations, a downlink control information (DCI) to the UE for retransmission of the data, the DCI including a schedule of a retransmission UL resource; and receiving the data on the retransmission UL resource from the UE using the one or more retransmission resource combinations, wherein each initial resource combination and each retransmission resource combination includes a combination of resource parameters including any one or more of a sounding reference signal (SRS) resource indicator (SRI), a transmit precoding matrix indicator (TPMI), and antenna ports, wherein the DCI indicates a combination of SRI, TPMI, and antenna ports, and wherein the one or more interpretation rules specify to the UE that the one or more retransmission resource combinations are to be determined based on comparisons of the SRI, TPMI, and antenna ports indicated in the DCI with the SRI, TPMI, and antenna ports of the one or more initial resource combinations configured through the RRC configuration.

16. The method of claim 15, wherein the DCI includes a redundancy version (RV), wherein the configured grant UL resource is configured to support same or more SRIs than the retransmission UL resource, and wherein the one or more interpretation rules specify that
when the combination of SRI, TPMI, and antenna ports indicated in the DCI matches a combination of SRI, TPMI, and antenna ports of one of the initial resource combination configured through the RRC configuration, the matching initial resource combination is muted, and all other initial resource combinations are included in the one or more retransmission resource combinations, when the combination of SRI, TPMI, and antenna ports indicated in the DCI does not match the combination of SRI, TPMI, and antenna ports of any of the initial resource combination configured through the RRC configuration, all of the initial resource combinations are excluded from the one or more retransmission resource combinations, and when one or more reserved bits of any of SRI, TPMI, and antenna ports indicated in the DCI are used, all of the initial resource combinations are included in the one or more retransmission resource combinations.

17. The method of claim 16, wherein the resource parameters also include a bandwidth part (BWP), wherein the DCI also indicates the BWP, and wherein the one or more interpretation rules specify that
when a combination of SRI, TPMI, antenna ports, and BWP indicated in the DCI matches a combination of SRI, TPMI, antenna ports, and BWP of one of the initial resource combination configured through the RRC configuration, the matching initial resource combination is muted, and all other initial resource combinations are included in the one or more retransmission resource combinations, when the combination of SRI, TPMI, antenna ports, and BWP indicated in the DCI does not match the combination of SRI, TPMI, antenna ports, and BWP of any of the initial resource combination configured through the RRC configuration, all of the initial resource combinations are excluded from the one or more retransmission resource combinations, and when one or more reserved bits of any of SRI, TPMI, antenna ports, and BWP indicated in the DCI are used, all of the initial resource combinations are included in the one or more retransmission resource combinations.

18. The method of claim 15,
wherein the DCI includes a redundancy version (RV),
wherein the configured grant UL resource is configured to support same or less SRIs than the retransmission UL resource, and
wherein the one or more interpretation rules specify that
when the combination of SRI, TPMI, and antenna ports indicated in the DCI does not match a combination of SRI, TPMI, and antenna ports of any of the one or more initial resource combination configured through the RRC configuration, the combination of SRI, TPMI, and antenna ports indicated in the DCI and at least one of the initial resource combination are included in the one or more retransmission resource combinations,
when the combination of SRI, TPMI, and antenna ports indicated in the DCI does match the combination of SRI, TPMI, and antenna ports of any of the initial resource combination configured through the RRC configuration, the matching initial resource combination is included in the one or more retransmission resource combinations, and
when one or more reserved bits of any of SRI, TPMI, and antenna ports indicated in the DCI are used, all of the initial resource combinations are included in the one or more retransmission resource combinations.

19. The method of claim 18, wherein the one or more interpretation rules specify that when the combination of SRI, TPMI, and antenna ports indicated in the DCI does match the combination of SRI, TPMI, and antenna ports of any of the initial resource combination configured through the RRC configuration and when there are multiple initial resource combinations, at least one of the other initial resource combination is also included in the one or more retransmission resource combinations.

20. The method of claim 18,
wherein the resource parameters also include a bandwidth part (BWP),
wherein the DCI also indicates the BWP, and
wherein the one or more interpretation rules specify that
when the combination of SRI, TPMI, antenna ports, and BWP indicated in the DCI does not match a combination of SRI, TPMI, antenna ports, and BWP of any of the one or more initial resource combination configured through the RRC configuration, the combination of SRI, TPMI, antenna ports, and BWP indicated in the DCI and at least one of the initial resource combination are included in the one or more retransmission resource combinations,
when the combination of SRI, TPMI, antenna ports, and BWP indicated in the DCI does match the combination of SRI, TPMI, antenna ports, and BWP of any of the initial resource combination configured through the RRC configuration, the matching initial resource combination is included in the one or more retransmission resource combinations, and
when one or more reserved bits of any of SRI, TPMI, antenna ports, and BWP indicated in the DCI are used, all of the initial resource combinations are included in the one or more retransmission resource combinations.

21. The method of claim 15,
wherein the RRC configuration comprises configuration of multiple choices of initial resource combinations with each choice including one or more initial resource combinations supported by the configured grant UL resource, and
wherein the one or more interpretation rules specify that a combination of any one or more of the SRI, TMPI, and antenna ports indicated in the DCI be interpreted as a choice index choosing one of the multiple choices of the initial resource combinations such that the initial resource combinations corresponding to the choice index are included in the one or more retransmission resource combinations.

22. The method of claim 21, wherein a redundancy version (RV) indicated in the DCI.

23. The method of claim 21,
wherein the RRC configuration is such that each initial resource combination includes the combination of resource parameters that includes a redundancy version (RV) in addition to the SRI, TMPI, and antenna ports, and
wherein the one or more interpretation rules specify that a combination of the RV and any one or more of the SRI, TPMI, and antenna ports indicated in the DCI be interpreted as the choice index.

24. The method of claim 21,
wherein the RRC configuration is such that each initial resource combination includes the combination of resource parameters that includes a bandwidth part (BWP) in addition to the SRI, TMPI, and antenna ports, and
wherein the choice index comprises the BWP and any one or more of the SRI, TPMI, and antenna ports indicated in the DCI.

25. The method of claim 21, wherein when a reserved bit group comprising one or more reserved bits of any of SRI, TPMI, and antenna ports indicated in the DCI are used, the one or more interpretation rules specify that the one or more retransmission resource combinations be determined
based on comparisons of the SRI, TPMI, and antenna ports indicated in the DCI with the SRI, TPMI, and antenna ports of the one or more initial resource combinations, and
based on whether the reserved bit group indicates a first retransmission condition or a second transmission condition.

26. The method of claim 25, wherein when the reserved bit group indicates the first transmission condition, the one or more interpretation rules specify that
when the combination of SRI, TPMI, and antenna ports indicated in the DCI other than the reserved bit group matches a combination of SRI, TPMI, and antenna ports of one of the initial resource combinations configured through the RRC configuration, the matching initial resource combination is muted, and all other initial resource combinations are included in the one or more retransmission resource combinations,
when the combination of SRI, TPMI, and antenna ports indicated in the DCI other than the reserved bit group does not match the combination of SRI, TPMI, and antenna ports of any of the initial resource combinations configured through the RRC configuration, all of the initial resource combinations are excluded from the one or more retransmission resource combinations, and
when one or more reserved bits of any of SRI, TPMI, and antenna ports indicated in the DCI other than the reserved bit group are used, all of the initial resource combinations are included in the one or more retransmission resource combinations.

27. The method of claim 25, wherein when the reserved bit group indicates the second transmission condition, the one or more interpretation rules specify that when the combination of SRI, TPMI, and antenna ports indicated in the DCI other than the reserved bit group does not match a combination of SRI, TPMI, and antenna ports of any of the one or more initial resource combination configured through the RRC configuration, the combination of SRI, TPMI, and antenna ports indicated in the DCI and at least one of the initial resource combination are included in the one or more retransmission resource combinations, when the combination of SRI, TPMI, and antenna ports indicated in the DCI other than the reserved bit group does match the combination of SRI, TPMI, and antenna ports of any of the initial resource combination configured through the RRC configuration, the matching initial resource combination is included in the one or more retransmission resource combinations, and when one or more reserved bits of any of SRI, TPMI, and antenna ports indicated in the DCI other than the reserved bit group are used, all of the initial resource combinations are included in the one or more retransmission resource combinations.

28. A method performed by a user equipment (UE), the method comprising:

receiving a radio resource control (RRC) configuration from a network, the RRC configuration comprising configurations of one or more initial resource combinations supported by a configured grant uplink (UL) resource for initial transmission of data to the network;

receiving a schedule of the configured grant UL resource from the network;

transmitting the data on the configured grant UL resource to the network using the one or more initial resource combinations;

receiving a downlink control information (DCI) from the network for retransmission of the data, the DCI including a schedule of a retransmission UL resource;

determining one or more retransmission resource combinations based on the DCI, the DCI indicating a plurality of resource combinations; and retransmitting the data on the retransmission UL resource using the one or more retransmission resource combinations, wherein each initial resource combination and each retransmission resource combination includes a combination of resource parameters including any one or more of a redundancy version (RV), a sounding reference signal (SRS) resource indicator (SRI), transmit precoding matrix indicator (TPMI), and antenna ports, wherein each of the plurality of resource combinations indicated in the DCI that uses no reserved bits of the RV, SRI, TMPI, and antenna ports is included in the one or more transmission resource combinations.

29. The method of claim 28, wherein at most a first N resource combinations of the plurality of resource combinations are included in the one or more transmission resource combinations, and wherein N is indicated in the DCI or is configured through the RRC configuration.

30. A method performed by a network node, the method comprising:

sending a radio resource control (RRC) configuration to a user equipment (UE), the RRC configuration comprising configurations of one or more initial resource combinations supported by a configured grant uplink (UL) resource for initial transmission of data to the network;

sending a schedule of the configured grant UL resource to the UE;

sending, upon an error in receiving the data on the configured grant UL resource from the UE using the one or more initial resource combinations, a downlink control information (DCI) to the UE for retransmission of the data, the DCI including a schedule of a retransmission UL resource and indicating a plurality of resource combinations; and receiving the data on the retransmission UL resource from the UE using the one or more retransmission resource combinations, wherein each initial resource combination and each retransmission resource combination includes a combination of resource parameters including any one or more of a redundancy version (RV), a sounding reference signal (SRS) resource indicator (SRI), transmit precoding matrix indicator (TPMI), and antenna ports, wherein one or more of the plurality of resource combinations indicated in the DCI uses no reserved bits of the RV, SRI, TMPI, and antenna ports.

31. The method of claim 30, wherein a number N is included in the RRC configuration or is included in the DCI, the number N specifying to the UE that at most first N resource combinations of the plurality of resource combinations are to be included in the one or more transmission resource combinations.

32. A user equipment (UE), comprising:

a transceiver circuitry;

a memory circuitry; and a processor circuitry, wherein the transceiver circuitry, the memory circuitry, and the processor circuitry are configured to:

receive a radio resource control (RRC) configuration from a network, the RRC configuration comprising configurations of one or more initial resource combinations supported by a configured grant uplink (UL) resource for initial transmission of data to the network, and one or more interpretation rules to be applied by the UE for retransmission of the data to the network;

receive a schedule of the configured grant UL resource from the network;

transmit the data on the configured grant UL resource to the network using the one or more initial resource combinations;

receive a downlink control information (DCI) from the network for retransmission of the data, the DCI including a schedule of a retransmission UL resource;

determine one or more retransmission resource combinations based on the one or more interpretation rules and the DCI; and retransmit the data on the retransmission UL resource using the one or more retransmission resource combinations, wherein each initial resource combination and each retransmission resource combination includes a combination of resource parameters including any one or more of a sounding reference signal (SRS) resource indicator (SRI), a transmit precoding matrix indicator (TPMI), and antenna ports, wherein the DCI indicates a combination of SRI, TPMI, and antenna ports, and wherein the one or more interpretation rules specify that the one or more retransmission resource combinations be determined based on comparisons of the SRI, TPMI, and antenna ports indicated in the DCI with the SRI, TPMI, and antenna ports of the one or more initial resource combinations configured through the RRC configuration.

33. The UE of claim 32, wherein a redundancy version (RV) indicated in the DCI is included in the retransmission.

* * * * *